(12) United States Patent
Saraf

(10) Patent No.: US 8,370,193 B2
(45) Date of Patent: Feb. 5, 2013

(54) METHOD, COMPUTER-READABLE MEDIA, AND APPARATUS FOR DETERMINING RISK SCORES AND GENERATING A RISK SCORECARD

(75) Inventor: Asish Saraf, Mumbai (IN)

(73) Assignee: Bank of America Corporation, Charlotte, NC (US)

( * ) Notice: Subject to any disclaimer, the term of this patent is extended or adjusted under 35 U.S.C. 154(b) by 409 days.

(21) Appl. No.: 12/697,717

(22) Filed: Feb. 1, 2010

(65) Prior Publication Data

US 2011/0191138 A1  Aug. 4, 2011

(51) Int. Cl.
*G06F 17/00* (2006.01)
(52) U.S. Cl. ...................................... 705/7.36
(58) Field of Classification Search .............. 705/7.36
See application file for complete search history.

(56) References Cited

U.S. PATENT DOCUMENTS

| | | | |
|---|---|---|---|
| 7,359,865 B1 | 4/2008 | Connor et al. | |
| 7,603,283 B1 | 10/2009 | Spielmann et al. | |
| 2003/0229525 A1 | 12/2003 | Callahan et al. | |
| 2006/0259336 A1 | 11/2006 | Anas et al. | |
| 2007/0016542 A1 | 1/2007 | Rosauer et al. | |
| 2008/0033775 A1 | 2/2008 | Dawson et al. | |
| 2008/0154679 A1* | 6/2008 | Wade | 705/7 |
| 2008/0301040 A1 | 12/2008 | Knudson et al. | |
| 2010/0114634 A1* | 5/2010 | Christiansen et al. | 705/7 |

OTHER PUBLICATIONS

International Search Report and Written Opinion mailed Mar. 29, 2011 in International Application No. PCT/US/11/23111.

* cited by examiner

*Primary Examiner* — Thomas Dixon
(74) *Attorney, Agent, or Firm* — Banner & Witcoff, Ltd; Michael A. Springs

(57) ABSTRACT

Methods, computer readable media, and apparatuses for evaluating risk associated with a process are presented. Input corresponding to one or more risk elements may be received. An exposure score, an impact score, a likelihood score, and an element score may be determined for each risk element. One or more risk category scores may be determined based on the one or more element scores. One or more risk parameter scores may be determined based on the one or more risk category scores. An overall risk score may be determined based on the one or more risk parameter scores. A risk scorecard may be generated, and the risk scorecard may include a risk scorecard that visually depicts one or more of the determined scores.

21 Claims, 9 Drawing Sheets

| Risk Metric: | People | | | Direction | Process | | |
|---|---|---|---|---|---|---|---|
| Line of Business | H | M | L | | H | M | L |
| Line of Business 1 | 0 | 5 | 42 | ⇒ | 0 | 1 | 46 |

| Risk Parameter | Assessment | Actions |
|---|---|---|
| People | Direction of risk is stable. Assessment Point 1 | Action Item 1 Action Item 2 |
| Process | Direction of risk is stable. Assessment Point 2 | Action Item 3 Action Item 4 |
| System | Direction of risk is stable. Assessment Point 3 | Action Item 5 Action Item 6 |
| External Event | Direction of risk is stable. Assessment Point 4 | Action Item 7 Action Item 8 |
| Compliance | Direction of risk is increasing. Assessment Point 5 | Action Item 9 Action Item 10 |
| Overall | Residual risk is low and stable. Assessment Point 6 | Action Item 11 Action Item 12 |

FIG. 6

| Risk Metric: | People | | | Direction | Process | | |
|---|---|---|---|---|---|---|---|
| Line of Business | H | M | L | ⇧ | H | M | L |
| Line of Business 1 | 0 | 5 | 42 | | 0 | 1 | 46 |

| Risk Parameter | Assessment | Actions |
|---|---|---|
| People | *Direction of risk is stable. Assessment Point 1* | Action Item 1<br>Action Item 2 |
| Process | *Direction of risk is stable. Assessment Point 2* | Action Item 3<br>Action Item 4 |
| System | *Direction of risk is stable. Assessment Point 3* | Action Item 5<br>Action Item 6 |
| External Event | *Direction of risk is stable. Assessment Point 4* | Action Item 7<br>Action Item 8 |
| Compliance | *Direction of risk is increasing. Assessment Point 5* | Action Item 9<br>Action Item 10 |
| Overall | *Residual risk is low and stable. Assessment Point 6* | Action Item 11<br>Action Item 12 |

| Risk Metric: | People | | Direction | Process | |
|---|---|---|---|---|---|
| Enterprise Overall Risk | | | ⇑ | | |
| *Business Process Services Operations – Lines of Business* | | | | | |
| Line of Business 1 | H 0 | M 5 | L 42 | ⇑ | H 0 | M 1 | L 46 |
| Line of Business 2 | H 0 | M 2 | L 48 | ⇑ | H 0 | M 12 | L 38 |
| Line of Business 3 | H 6 | M 30 | L 106 | ⇐ | H 0 | M 39 | L 103 |
| Line of Business 4 | H 2 | M 11 | L 105 | ⇑ | H 0 | M 10 | L 108 |
| Line of Business 5 | H 1 | M 6 | L 53 | ⇑ | H 0 | M 7 | L 53 |
| *Internet Technology Services Operations – Lines of Business* | | | | | |
| Line of Business 6 | H 0 | M 5 | L 301 | ⇑ | H 0 | M 36 | L 270 |
| Line of Business 7 | H 0 | M 0 | L 26 | ⇑ | H 3 | M 11 | L 134 |

FIG. 7

METHOD, COMPUTER-READABLE MEDIA, AND APPARATUS FOR DETERMINING RISK SCORES AND GENERATING A RISK SCORECARD

BACKGROUND

Governments, organizations, and other entities often implement processes in which one or more different types of risk may be involved. As such entities grow and implement an increasing number of processes, evaluating the different types of risk involved in such processes may become complex.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of this disclosure relate to evaluating risk associated with a process. According to one or more aspects, process risk may be evaluated. Input may be received, and the input may correspond to at least one risk element applicable to at least one process. Each of the at least one risk element may be associated with at least one risk category, and each of the at least one risk category may be associated with at least one risk parameter. Subsequently, an exposure score for each of the at least one risk element may be determined based on the received input. An impact score for each of the at least one risk element may be determined based on stored impact information. A likelihood score for each of the at least one risk element may be determined based on stored trend information. Thereafter, an element score for each of the at least one risk element may be determined based on the corresponding exposure score for each of the at least one risk element, the corresponding impact score for each of the at least one risk element, and the corresponding likelihood score for each of the at least one risk element. Then, a risk category score for each of the at least one risk category may be determined based on the at least one element score for the at least one risk element associated with the risk category. A risk parameter score for each of the at least one risk parameter may be determined based on the at least one risk category score for the at least one risk category associated with the risk parameter. Subsequently, an overall risk score for the at least one process may be determined based on the at least one risk parameter score.

According to one or more additional aspects, a risk scorecard may be generated, and the risk scorecard may visually depict each of the at least one risk parameter score and the overall risk score for the at least one process.

BRIEF DESCRIPTION OF THE DRAWINGS

The present disclosure is illustrated by way of example and not limited in the accompanying figures in which like reference numerals indicate similar elements and in which:

FIG. 6 illustrates a sample user interface that includes a risk scorecard according to one or more aspects described herein.

FIG. 7 illustrates a sample user interface that includes a summary risk scorecard according to one or more aspects described herein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1A:
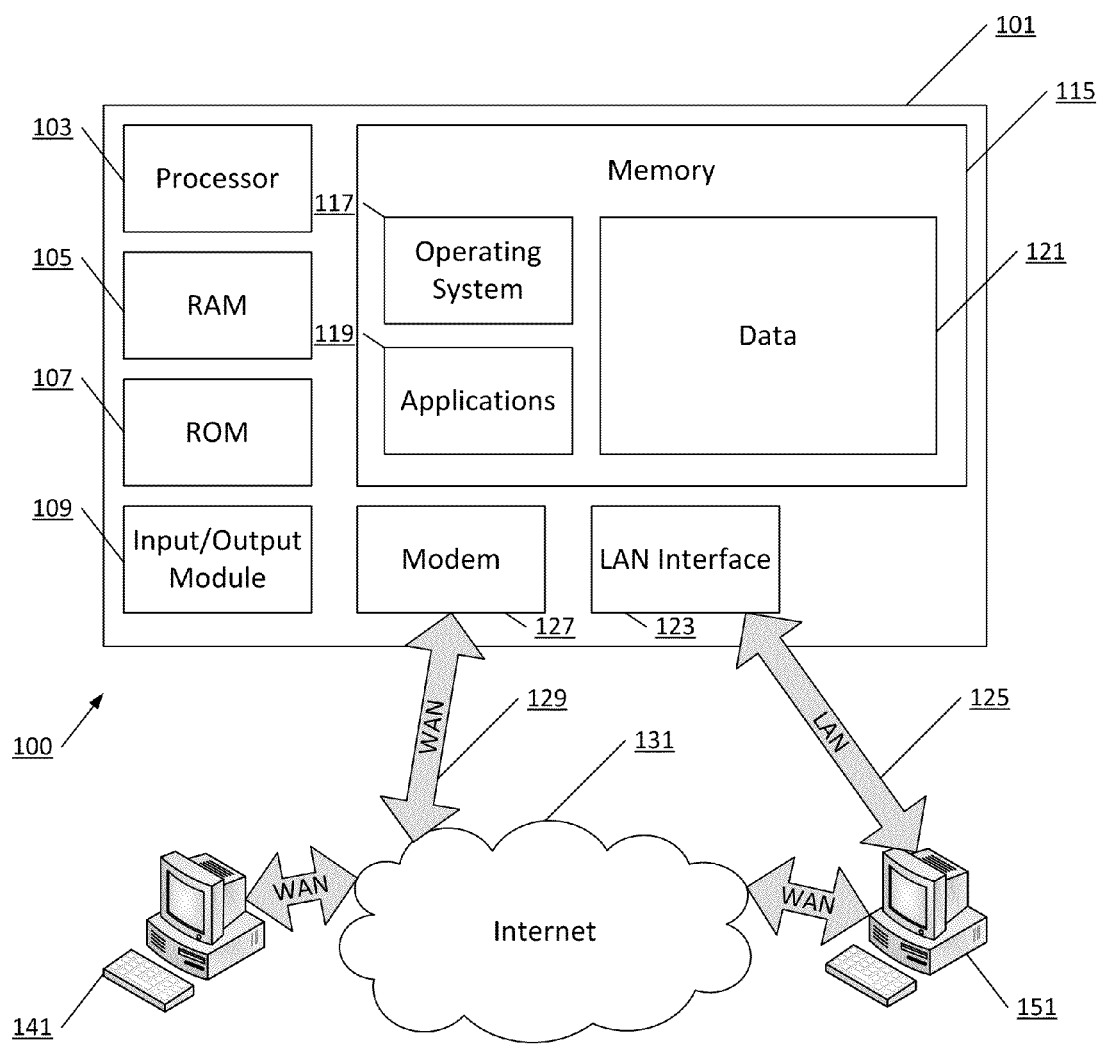
FIG. 1A illustrates a suitable operating environment in which various aspects of the disclosure may be implemented.

FIG. 1A illustrates a block diagram of a generic computing device 101 (e.g., a computer server) in computing environment 100 that may be used according to one or more illustrative embodiments of the disclosure. The computer server 101 may have a processor 103 for controlling overall operation of the server and its associated components, including random access memory (RAM) 105, read-only memory (ROM) 107, input/output (I/O) module 109, and memory 115.

I/O 109 may include a microphone, mouse, keypad, touch screen, scanner, optical reader, and/or stylus (or other input device(s)) through which a user of server 101 may provide input, and may also include one or more of a speaker for providing audio output and a video display device for providing textual, audiovisual, and/or graphical output. Software may be stored within memory 115 and/or other storage to provide instructions to processor 103 for enabling server 101 to perform various functions. For example, memory 115 may store software used by the server 101, such as an operating system 117, application programs 119, and an associated database 121. Alternatively, some or all of the computer executable instructions for server 101 may be embodied in hardware or firmware (not shown).

The server 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 may be connected to the LAN 125 through a network interface or adapter 123. When used in a WAN networking environment, the server 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP, HTTPS, and the like is presumed.

Computing device 101 and/or terminals 141 or 151 may also be mobile terminals (e.g., mobile phones, PDAs, and notebooks) including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 1B:
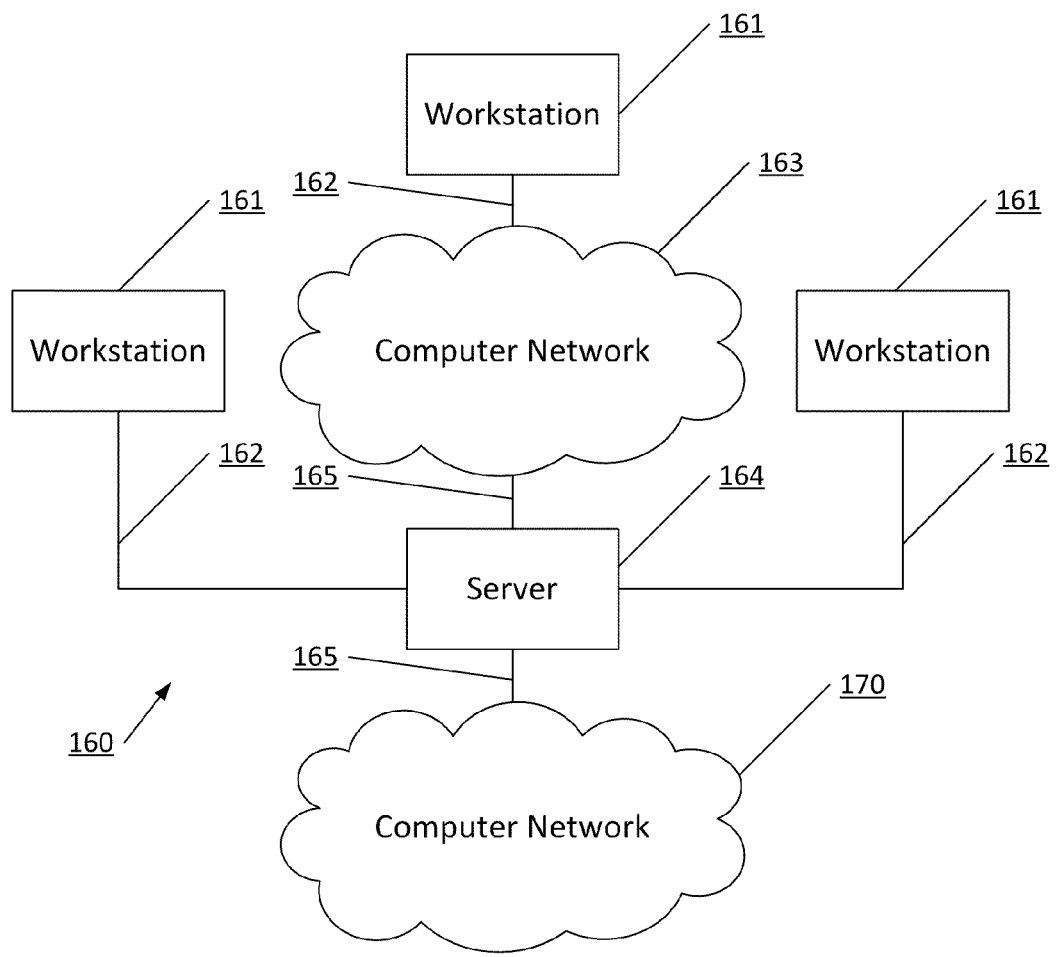
FIG. 1B illustrates a suitable system in which various aspects of the disclosure may be implemented.

FIG. 1B illustrates a suitable system 160 in which various aspects of the disclosure may be implemented. As illustrated, system 160 may include one or more workstations 161. Workstations 161 may be local or remote, and may be connected by one or communications links 162 to computer network 163 that may be linked via communications links 165 to server 164. In system 160, server 164 may be any suitable server, processor, computer, or data processing device, or combination of the same. Server 164 may be used to process the instructions received from, and the transactions entered into by, one or more participants.

Computer network 163 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 162 and 165 may be any communications links suitable for communicating between workstations 161 and server 164, such as network links, dial-up links, wireless links, and hard-wired links.

Figure 2:
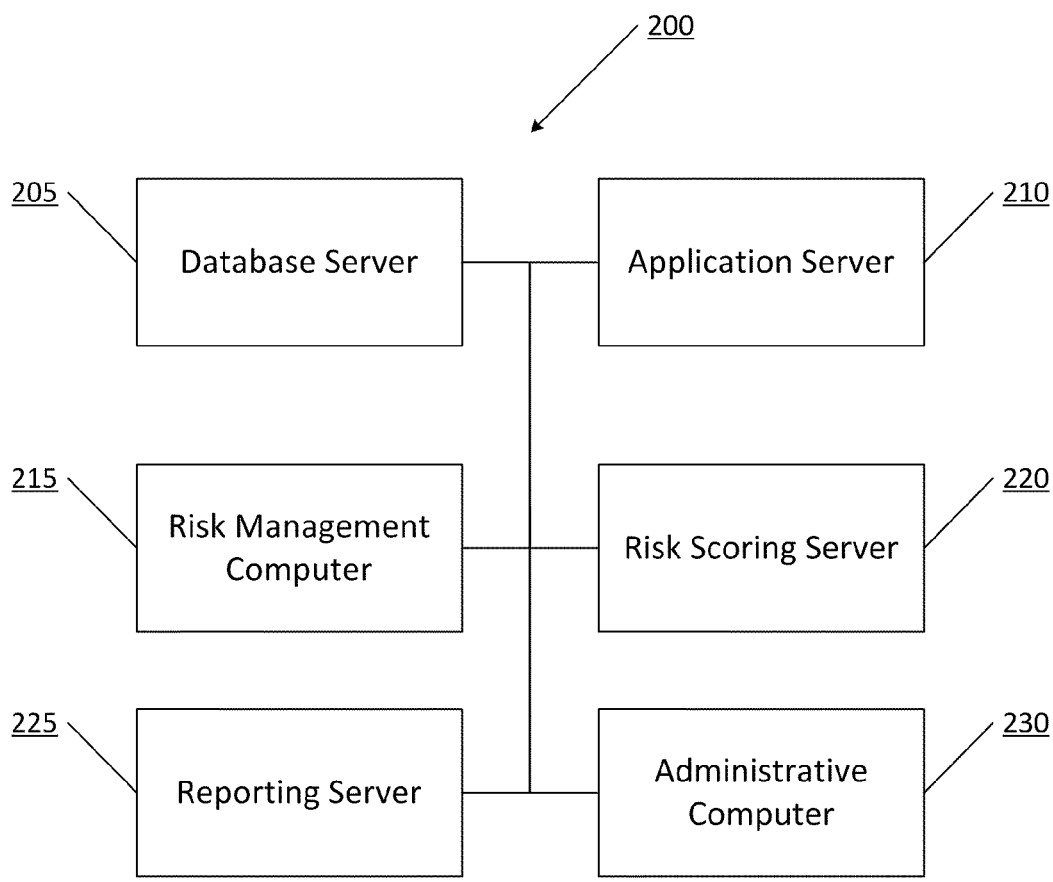
FIG. 2 illustrates a suitable network environment in which various aspects of the disclosure may be implemented.

FIG. 2 illustrates a suitable network environment in which various aspects of the disclosure may be implemented. Network environment 200 may include several computing devices. For example, network environment 200 may include database server 205, application server 210, risk management computer 215, risk scoring server 220, reporting server 225, and administrative computer 230.

In one or more arrangements, database server 205 may store information about one or more processes, previously measured and/or analyzed historical process data, risk management information, one or more computation preferences (e.g., user-defined weights to be assigned to various types of information in analyzing risk), one or more risk reports (e.g., one or more risk scorecards and/or one or more risk heat maps), administrative data, and/or other information and/or data as further described herein. For example, database server 205 may store historical process data, which may enable a system implementing one or more aspects of the disclosure to calculate a regression and/or perform trend analysis. Such a calculation may be used, for instance, in determining a likelihood score for a risk element, as further described below.

In at least one arrangement, application server 210 may receive and/or store information about one or more risk elements, risk categories, and/or risk parameters; determine one or more exposure scores, impact scores, and/or likelihood scores; determine one or more risk element scores, risk category scores, and/or risk parameter scores; and/or otherwise process data related to risk evaluation. For example, application server 210 may receive and/or store information that may be used in determining an exposure score, an impact score, and/or a likelihood score for a risk element, and application server 210 subsequently may determine such scores, as well as an overall element score, for the risk element.

In at least one arrangement, risk management computer 215 may generate and/or display one or more user interfaces related to risk management generally, including user interfaces related to one or more processes, one or more risk elements, one or more risk categories, one or more risk parameters, one or more risk assessments, one or more risk reports (e.g., one or more risk scorecards and/or one or more risk heat maps, which are further described below), and/or other information. For example, risk management computer 215 may generate and/or display a user interface allowing a user, such as a risk manager, to enter input that may be used in calculating an exposure score and/or conducting a risk assessment for a particular business process. Such a user interface, for instance, may include one or more attributes similar to those of the sample user interfaces illustrated in FIGS. 4 and 5, which are further described below.

In at least one arrangement, risk scoring server 220 may receive and/or store information about one or more risk elements, risk categories, and/or risk parameters; determine one or more risk element scores, risk category scores, and/or risk parameter scores; aggregate and/or analyze information related to one or more risk element scores, risk category scores, and/or risk parameter scores; and/or otherwise process data related to risk evaluation. For example, risk scoring server 220 may aggregate and/or analyze one or more risk parameter scores for a plurality of business processes implemented and/or managed by a plurality of internal divisions, and such aggregation and/or analysis may be used in producing one or more risk reports. For instance, a risk report (e.g., a risk scorecard) may include aggregated and/or analyzed information about one or more risk parameters, as may be seen in the sample user interfaces illustrated in FIGS. 6 and 7, which are further described below.

In at least one arrangement, reporting server 225 may receive, analyze, and/or store information about one or more risk elements, risk categories, and/or risk parameters, including aggregated and/or analyzed information; generate and/or display one or more risk reports (e.g., one or more risk scorecards and/or one or more heat maps); and/or otherwise process and/or display data related to risk evaluation. For example, reporting server 225 may receive aggregated and/or analyzed information related to one or more risk parameters; may generate, based on such information, one or more risk assessments and/or one or more action items; and subsequently may generate and/or display a risk report (e.g., a risk scorecard) that includes the aggregated and/or analyzed information related to the one or more risk parameters, the one or more generated risk assessments, and/or the one or more generated action items. For instance, reporting server 225 may generate a risk report (e.g., a risk score) similar to those of the sample user interfaces illustrated in FIGS. 6 and 7, which are further described below.

In at least one arrangement, administrative computer 230 may generate one or more user interfaces related to system configuration, system status, system logs, and/or other information. Such user interfaces, for example, may enable a user to configure and/or interact with a system implementing one or more aspects of the disclosure.

While network environment 200 is described as including various computers adapted to perform various functions, it should be understood that the system may be modified to include a greater or lesser number of computers which may be used alone or in combination to provide the same functionality. For example, a single computer may be used to perform all of the functions described, and one or more users may interact with the single computer through one or more terminals and/or user interfaces. In another example, a first computer may be used to perform all of the functions of database server 205 and application server 210, a second computer may be used to perform all of the functions of risk management computer 215 and risk scoring server 220, and a third computer may be used to perform all of the functions of reporting server 225 and administrative computer 230. In addition, while various analyses are described with respect to various internal divisions within an organization, similar analyses may be performed with respect to a greater and/or lesser number of internal divisions and/or designations within an organization, such as a financial institution.

Figure 3A:
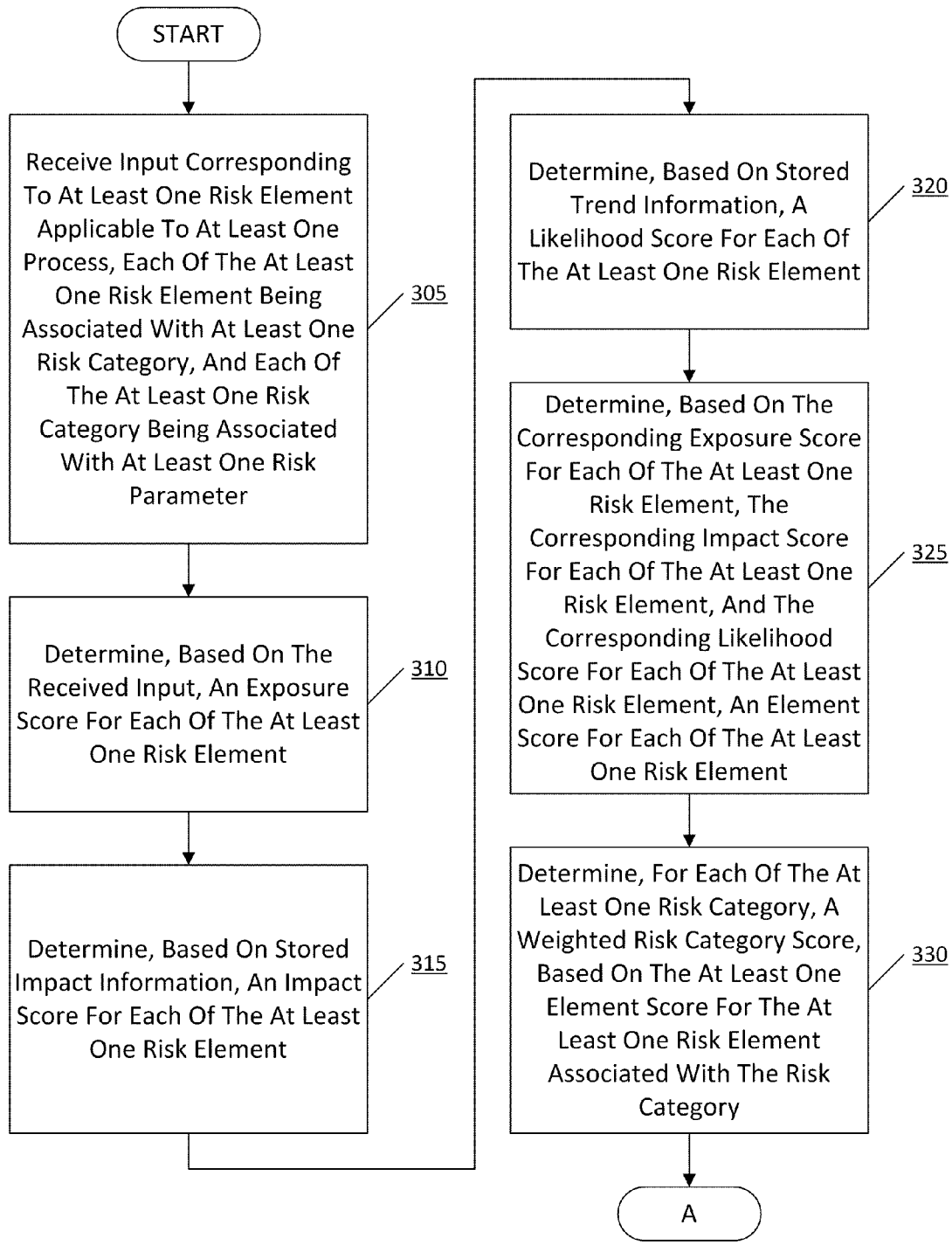
FIGS. 3A and 3B illustrate a method by which risk associated with a process may be evaluated according to one or more aspects described herein.
Figure 3B:
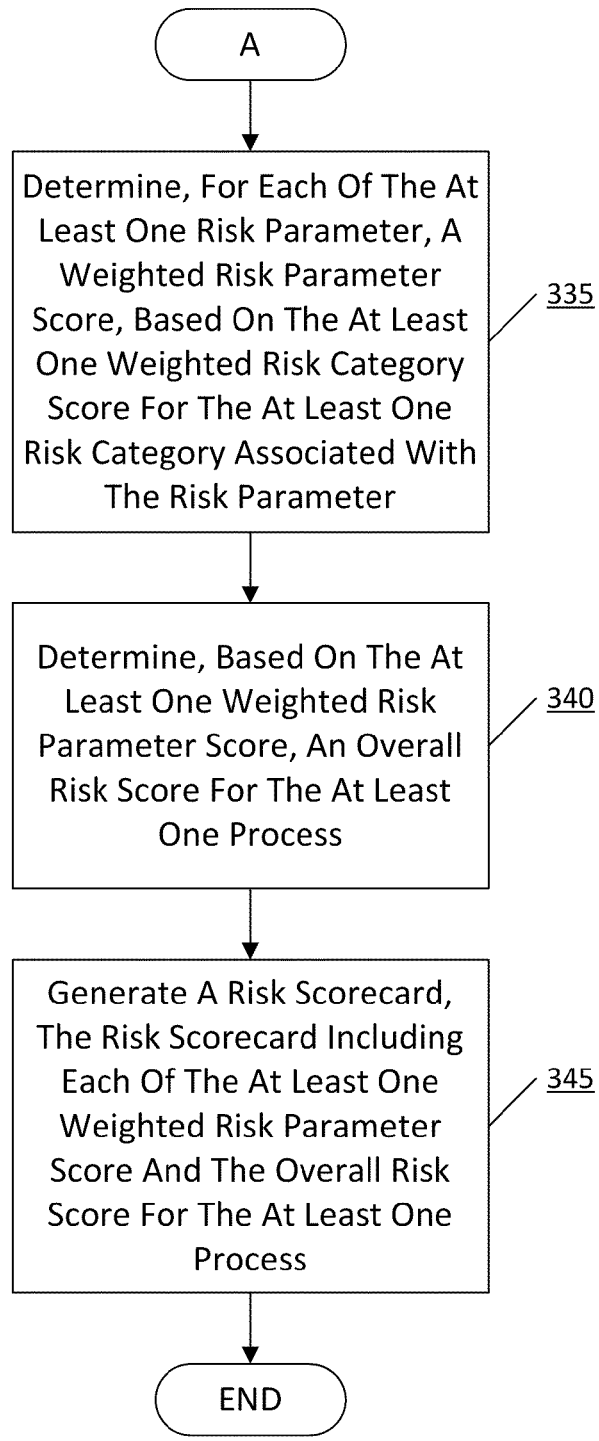

FIGS. 3A and 3B illustrate a method by which risk associated with a process may be evaluated according to one or more aspects described herein. According to one or more aspects, the methods described herein may be implemented by software executed on one or more computers, such as computing device 101, and/or in a network environment, such as network environment 200.

In step 305, input may be received, and the input may correspond to one or more risk elements which may be applicable to at least one process. Each of the one or more risk elements may be associated with one or more risk categories, and each of the one or more risk categories may be associated with one or more risk parameters.

For example, in step 305, input may be received at one or more computers via one or more user interfaces. The one or more user interfaces may be part of an internal web portal maintained by a financial institution. The received input may include answers to one or more questions, and each of the one or more questions may correspond to at least one risk element. Additionally, the one or more user interfaces may include a set of questions for each of the one or more risk elements, and each set of questions may be organized and/or presented under a heading identifying the risk category and/or the risk parameter associated with the particular risk element. For instance, under a risk parameter of "People," the user interfaces may present questions to the user like: "How many associates are involved in the process?" under a risk category of "Support"; "What is the associate utilization percentage?" under a risk category of "Resource Utilization"; and "What is the annualized associate attrition rate?" under a risk category of "Attrition." In response to the one or more questions, the user may provide answers in numerical form (e.g., "22%"), in a "Yes/No/Maybe" form (e.g., the user may choose "Yes," "No," or "Maybe" in response to a particular question), or in a descriptive form (e.g., the user may choose a descriptive answer, such as "Very Likely" or "Unlikely" from a set of one or more possible answers). Additional risk parameters, risk categories, and/or risk elements may be included, and such risk parameters, risk categories, and risk elements are described further below.

In step 310, an exposure score for each risk element of the one or more risk elements may be determined based on the received input. For example, a system implementing one or more aspects of the disclosure may process the received input and/or may associate numerical values with non-numerical aspects of the received input. Subsequently, the system may perform calculations using the processed information to determine an exposure score for each risk element. For instance, the system may store the received input in memory, and the system may associate predetermined numerical values with non-numerical aspects of the received input (e.g., the system may associate a "5" with a "Yes" answer, a "3" with a "Maybe" answer, and a "1" with a "No" answer; or, the system may associate a "5" with a "Very Likely" answer, a "3" with a "Neutral" answer, and a "1" with a "Very Unlikely" answer). Then, the system may determine an exposure score for each risk element by averaging, for each risk element, the 1-to-5 value for the corresponding aspects of the received input (e.g., if two questions related to a particular risk element within the "Support" risk category and the "People" risk parameter had corresponding 1-to-5 values of "3" and "5," the system may calculate the exposure score for the particular risk element to be "4").

Additionally or alternatively, a threshold may be predefined for each risk element, and a 1-to-5 value, representing the deviation from the predefined threshold, may be determined for each risk element based on the corresponding aspects of the received input. For example, a particular risk element (e.g., the "monthly turnover" risk element within the "Attrition" risk category and the "People" risk parameter) may be directed to measuring employee turnover. Thus, in this example, the received input may be a number (e.g., "21") representing the actual amount of employee turnover during a relevant time period (e.g., the previous month). Determining the exposure score for employee turnover in this example, however, may be based on determining the deviation from a predefined threshold. For instance, a set of predefined thresholds may provide that a monthly employee turnover rate of "5 or less" corresponds to an exposure score of "1", a monthly employee turnover rate of "6 to 25" corresponds to an exposure score of "2", a monthly employee turnover rate of "26 to 50" corresponds to an exposure score of "3", a monthly employee turnover rate of "51 to 100" corresponds to an exposure score of "4"; and a monthly employee turnover rate of "101 or more" corresponds to an exposure score of "5". In this example, then, where the received input identifies the monthly employee turnover rate to be "21," the exposure score for the "monthly turnover" risk element may be determined to be "2," as based on the set of predefined thresholds.

In step 315, an impact score for each risk element of the one or more risk elements may be determined based on stored impact information. For example, stored impact information may define a particular impact score for each risk element of the one or more risk elements. These defined particular impact scores may be predefined by one or more users of the system (e.g., risk managers) using one or more user interfaces. Thus, determining an impact for each risk element may include retrieving one or more predefined impact scores from the stored impact information.

For instance, in step 315, the system may determine an impact score for a particular risk element (e.g., the "monthly turnover" risk element within the "Attrition" risk category and the "People" risk parameter) that may be directed to measuring employee turnover. The system may perform a lookup in a database that includes one or more impact scores for one or more risk elements. The impact scores stored in the database may be predefined by one or more risk managers. In other words, a risk manager may have determined that, on a scale of 1 to 5, employee turnover has an impact of "4," and thus "4" may be the impact score stored in the database for the "monthly turnover" risk element. Thus, the system may determine, based on the database lookup, that the impact score for the particular risk element is "4."

In step 320, a likelihood score may be determined for each risk element of the one or more risk elements based on stored trend information. For example, for each risk element, the system may analyze past data (e.g., data from the past six months) to estimate the likelihood of the occurrence of a risk event corresponding to the particular risk element. For instance, for each risk element, the system may perform trend analysis and/or regression analysis using risk data (e.g., the exposure scores for the particular risk element from the past six months) to predict a 1-to-5 value representing a likelihood score for the particular risk element.

For example, in step 320, the system may determine a likelihood score for a particular risk element (e.g., the "monthly turnover" risk element within the "Attrition" risk category and the "People" risk parameter) that may be directed to measuring employee turnover. To make such a determination, the system may retrieve historical risk data associated with the "monthly turnover" risk element, such as the exposure scores and likelihood scores for the past six months. Then, the system may perform trend analysis or compute a regression based on this historical risk data. For instance, if the exposure scores and likelihood scores all have been "2" in the last six months, the system may determine the likelihood score for the instant month to be "2" as well, since the trend is steady and/or constant over the relevant six-month time period. Thus, in this example, the system may determine a likelihood score for the risk element based on stored trend information.

In step 325, an element score for each risk element may be determined based on the corresponding exposure score for each risk element, the corresponding impact score for each risk element, and the corresponding likelihood score for each risk element. For example, an element score for each risk element may be calculated by multiplying, for each risk element, the exposure score by the impact score by the likelihood score. For each risk element, the resulting product may represent the element score.

For instance, in step 325, the system may determine an element score for a particular risk element (e.g., the "monthly turnover" risk element within the "Attrition" risk category and the "People" risk parameter) that may be directed to measuring employee turnover. To make such a determination, the system may multiply the exposure score for the risk element (which was determined to be "2" in the example above) by the impact score for the risk element (which was determined to be "4" in the example above) by the likelihood score for the risk element (which was determined to be "2" in the example above). Thus, in this example, the system may determine the risk element score for the particular "monthly turnover" risk element to be (2×4×2) or 16.

In step 330, a weighted risk category score for each risk category of the one or more risk categories may be determined based on the one or more element scores for the one or more risk elements associated with the risk category. For example, the system may calculate, for each risk category of the one or more risk categories, a weighted risk category score by computing a weighted average of the one or more element scores for the one or more risk elements associated with the particular risk category.

The weights to be assigned to the various element scores may be predetermined, or in some configurations, the weights to be assigned to the various element scores may be determined automatically by the system. For instance, the system may disregard automatically one or more risk elements that might not be applicable to the particular process, and subsequently, the system may assign automatically variable or equal weight to each of the applicable risk elements in computing the weighted risk category score.

Additionally or alternatively, as may be seen in the sample user interfaces illustrated in FIGS. 4 and 5, which are further described below, different types of processes may be associated with different sets of risk categories. For instance, a "Business Process Services" process may be associated with a "Span of Control" risk category, while an "Internet Technology Services" process might not be associated with such a risk category.

For example, in step 330, the system may determine a weighted risk category score for a particular risk category (e.g., the "Support" risk category within the "People" risk parameter) based on the one or more element scores for the one or more risk elements associated with the particular risk category. For instance, the "Support" risk category may include a "total associates and contractors count" risk element, which may represent the total number of associates and contractors involved in a process; a "total billable associates count" risk element, which may represent the total number of billable associates involved in the process; a "number of open positions" risk element, which may represent the number of positions in the process that currently are unfilled; an "employee satisfaction" risk element, which may represent whether a recent employee satisfaction survey score is below a target employee satisfaction survey score; and a "critical resource without backup" risk element, which may represent the number of resources performing critical and/or not easily replaceable roles without a backup and/or cross-trained resource. In this example, each of these risk elements might be assigned equal weight within the "Support" risk category, and thus the weighted risk category score may be determined to be the calculated average of the risk element scores. Thus, if the "total associates and contractors count" risk element had a risk element score of 100, the "total billable associates count" risk element had a risk element score of 80, the "number of open positions" risk element had a risk element score of 20, and the "number of open positions" risk element had a risk element score of 50, the weighted risk category score may be determined to be [(100+80+20+50)/4] or 62.5.

In step 335, a weighted risk parameter score for each risk parameter of the one or more risk parameters may be determined based on the one or more weighted risk category scores for the one or more risk categories associated with the risk parameter. For example, the system may calculate, for each risk parameter of the one or more risk parameters, a weighted risk parameter score, by computing a weighted average of the one or more risk category scores of the one or more risk categories associated with the particular risk parameter. The weights to be assigned to the various risk category scores may be predetermined, or in some configurations, the weights to be assigned to the various risk category scores may be determined automatically by the system. For instance, in calculating a risk parameter score for each of the one or more risk parameters, the system may be configured to emphasize certain risk categories (e.g., the "Attrition" and "Resource Utilization" risk categories within the "People" risk parameter) over other risk categories (e.g., the "Support" risk category within the "People" risk parameter). A user (e.g., a risk manager) may define the weights to be applied to the various risk categories in determining the weight risk parameter scores, or the system may determine automatically, based on the type of process being analyzed and/or other data, to assign variable and or equal weight to each of the risk categories in computing the risk parameter scores.

For example, in step 335, the system may determine a weighted risk parameter score for a particular risk parameter (e.g., the "People" risk parameter) based on the one or more weighted risk category scores for the one or more risk categories associated with the "People" risk parameter. For instance, the "People" risk parameter may include a "Support" risk category, which may include risk elements associated with process support services provided by employees; an "Attrition" risk category, which may be associated with employee turnover; and a "Resource Utilization" risk category, which may be associated with employee productivity. In this example, the "Support" risk category might be assigned a 20% weight, the "Attrition" risk category might be assigned a 40% weight, and the "Resource Utilization" risk category might be assigned a 40% weight. Thus, if the "Support" risk category had a weighted risk category score of 62.5, the "Attrition" risk category had a weighted risk category score of 16, and the "Resource Utilization" risk category had a weighted risk category score of 30, the weighted risk parameter score for the "People" risk parameter may be determined to be [(0.20×62.5)+(0.40×16)+(0.40×30)] or 30.9.

In step 340, an overall risk score for the at least one process may be determined based on the one or more weighted risk parameter scores. For example, the system may calculate an overall risk score for the particular process under consideration by computing a weighted average of the one or more weighted risk parameter scores that have been determined and/or calculated for the particular process. The weights to be assigned to the various weighted risk parameter scores may be predetermined (e.g., by a user, such as a risk manager), or in some configurations, the weights to be assigned to the various weighted risk parameter scores may be determined automatically by the system. In calculating the overall risk score, the system may be configured to emphasize some of the risk parameters (e.g., the "System" risk parameter, the "Process" risk parameter, and the "Compliance" risk parameter) over others (e.g., the "People" risk parameter and the "External Event" risk parameter) by assigning greater weights to those risk parameters to be emphasized and lesser weights to the other risk parameters.

For example, in step 340, the system may determine an overall risk score for the process based on the weighted risk parameter scores for the risk parameters associated with the process. For instance, five risk parameters may be associated with the process: a "People" risk parameter, which may represent risk arising from management error, organizational structure, and/or human resources issues, such as excessive turnover, inadequate training, and/or fraud; a "Process" risk parameter, which may represent risk arising from the management, documentation, implementation, execution, and reporting of processes, products, and/or services, in addition to concerns over efficiency and/or effectiveness; a "System" risk parameter, which may represent risk arising from the complexity, stability, deficiencies, management, maintenance, and execution of systems and/or technology that support organizational activities and/or processes; an "External Event" risk parameter, which may represent risk arising from factors that are relatively outside the organization's normal scope of control, such as risk arising from third-party interactions (e.g., interactions with vendors, alliances, labor unions, and/or service providers) and/or political, social, cultural, and/or environmental concerns; and a "Compliance" risk parameter, which may represent risk arising from compliance with one or more laws, regulations, rules, and/or internal policies. In this example, the "People" risk parameter might be assigned a 15% weight, the "Process" risk parameter might be assigned a 20% weight, the "System" risk parameter might be assigned a 30% weight, the "External Event" risk parameter might be assigned a 15% weight, and the "Compliance" risk parameter might be assigned a 20% weight. Thus, if the "People" risk parameter had a weighted risk parameter score of 30.9, the "Process" risk parameter had a weighted risk parameter score of 28.7, the "System" risk parameter had a weighted risk parameter score of 34.4, the "External Event" risk parameter had a weighted risk parameter score of 19.8, and the "Compliance" risk parameter had a weighted risk parameter score of 41.1, the overall risk score for the process may be determined to be [(0.15×30.9)+(0.20×28.7)+(0.30×34.4)+(0.15×19.8)+(0.20×41.1)] or 31.885.

In step 345, a risk scorecard may be generated, and the risk scorecard may include each of the one or more weighted risk parameter scores and the overall risk score for at least one process. For example, the risk scorecard may illustrate, for each of the one or more risk parameters and for the overall risk score, color-coded designations to indicate the level of risk associated with the particular risk parameter and the overall process (e.g., red indicators to indicate high risk, yellow indicators to indicate moderate risk, and green indicators to indicate low risk). As used herein, a risk heat map may be equivalent to a risk scorecard.

Additionally or alternatively, the risk scorecard may include one or more color-coded arrows to show the direction in which a particular risk parameter and/or the overall risk score is moving over time. For instance, if trend data and/or other information indicates that the amount of risk associated with the "People" risk parameter has increased over the previous month's data for that risk parameter, the system may include in the risk scorecard an upward arrow for that risk parameter to indicate the increase in the amount of risk. Similarly, if trend data and/or other information indicates that the amount of risk associated with the "Systems" risk parameter has remained constant in relation to the previous month's data for that risk parameter, the system may include in the risk scorecard a horizontal arrow for that risk parameter to indicate that there has been no change in the amount of risk. Likewise, if trend data and/or information indicates that the amount of risk associated with the "Compliance" risk parameter has decreased in relation to the previous month's data for that risk parameter, the system may include in the risk scorecard a downward arrow for that risk parameter to indicate the decrease in the amount of risk.

In one or more additional arrangements, the risk scorecard further may be abstracted to illustrate, for each business unit of one or more business units of an organization, color coded data and risk-movement indicators (e.g., the arrows described above) for a plurality of the business processes within the particular business unit. In this way, a high-level risk report may be provided. Risk reports (e.g., risk scorecards and/or risk heat maps) are described further below.

Figure 4:
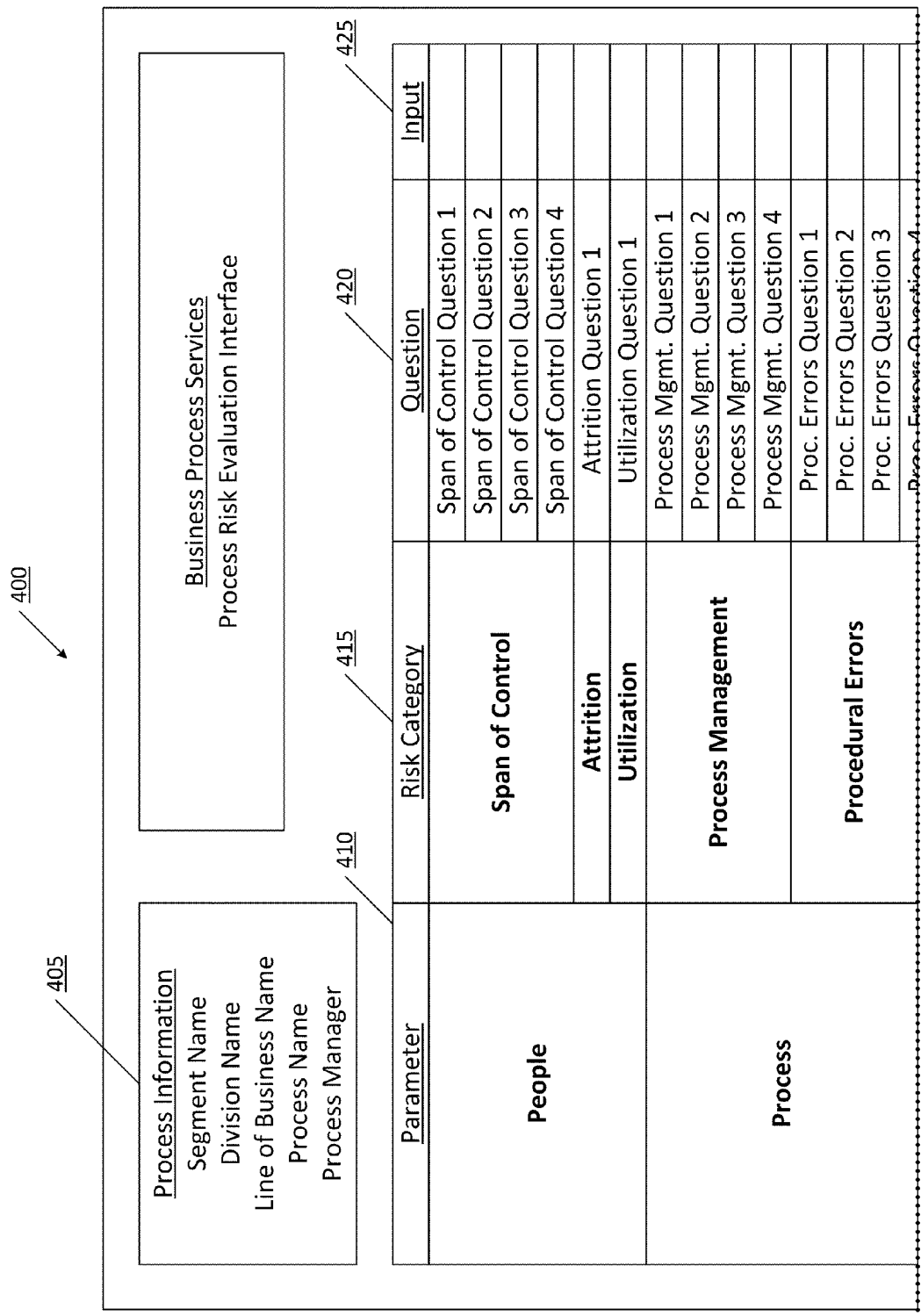
FIG. 4 illustrates a sample user interface by which one or more risk elements associated with a process may be assessed according to one or more aspects described herein.

FIG. 4 illustrates a sample user interface by which one or more risk elements associated with a process may be assessed according to one or more aspects described herein. According to one or more aspects, the user interfaces described herein may be implemented by software executed on one or more computers, such as computing device 101, and/or in a network environment, such as network environment 200.

In one or more configurations, user interface 400 may include and/or facilitate the inputting of information related to one or more processes, such as process management information and/or risk management information. For example, user interface 400 may include process information box 405. Process information box 405 may include information about a process being analyzed. For instance, process information box 405 may include the name of the process, the name of a manager of the process, the name of a business segment implementing the process, the name of a business division managing the business segment, and the name of a line of business within which the business division operates. While process information box 405 is illustrated as including information about a plurality of internal divisions within an organization, such as a financial institution, process information box 405 may include other information and/or may be adapted to the organizational structure of any entity.

In at least one configuration, user interface 400 further may include risk parameter column 410. Risk parameter column 410 may include a listing for each of one or more risk parameters for which information may be collected via user interface 400. For example, risk parameter 410 may include a plurality of listings, such as a listing for each of a "People" risk parameter, a "Process" risk parameter, a "System" risk parameter, an "External Event" risk parameter, and a "Compliance" risk parameter. Adjacent to each listing of a risk parameter might be one or more listings of risk categories associated with the risk parameter, as further described below. In addition, while all of the listings of risk parameters, risk categories, risk elements, and input fields might not fit on a single display, user interface 400 may allow a user to scroll through the entirety of the listings, as indicated by the dotted line in FIG. 4.

In at least one configuration, user interface 400 further may include risk category column 415. Risk category column 415 may include a listing for each of one or more risk categories for which information may be collected via user interface 400, and each listing may be adjacent to a risk parameter listing in risk parameter column 410 with which the particular risk category may be associated. For example, risk category column 415 may include plurality of listings, such as a listing for each of a "Span of Control" risk category, an "Attrition" risk category, and a "Utilization" risk category, which may correspond to the "People" risk parameter; a "Process Management" risk category, a "Procedural Errors" risk category, a "Financial Loss" risk category, and a "Business Continuity Planning Issues" risk category, which may correspond to the "Process" risk parameter; a "System Performance Issues" risk category and a "System Outage Losses" risk category, which may correspond to the "System" risk parameter; a "Reputation Risk" risk category and an "External Risk" risk category, which may correspond to the "External Event" risk parameter; and an "Audit Issues" risk category, a "Privacy and Information Security" risk category, an "Associate Investment Policy" risk category, and a "Statistical Compliance Analysis" risk category, which may correspond to the "Compliance" risk parameter. Adjacent to each listing of a risk category might be one or more listings of risk elements associated with the risk category, as further described below.

In at least one configuration, user interface 400 further may include risk element column 420. Risk element column 420 may include a listing for each of one or more risk elements for which information may be collected via user interface 400, and each listing may be adjacent to a risk category listing in risk category column 415 with which the particular risk element may be associated. For example, risk element column 420 may include a plurality of listings, and each listing of a risk element may include a question directed to information relevant to the particular risk category with which the risk element may be associated. For instance, risk element column 420 may include a plurality of listings associated with the Span of Control risk category, and each listing may include a question directed to information relevant to evaluating an organization's control over the process identified in process information box 405. Thus, in this example, the listings associated with the Span of Control risk category may include questions such as: "What is the total number of billable associates in the process?"; "How many managers are involved in the process?"; and "How many managers involved in the process are managing more than one team?"

In at least one configuration, user interface 400 further may include input column 425. Input column 425 may include one or more fields for each of the one or more risk elements for which information may be collected via user interface 400, and each row of one or more fields may be adjacent to a risk element listing in risk element column 420 with which the particular row of one or more fields may be associated. Thus, input column 425 may allow a user to enter one or more inputs (e.g., numbers, percentages, and text descriptions), which may enable the system to collect information via user interface 400. For instance, input column 425 may include one or more fields (and/or one or more rows of fields) associated with the Span of Control risk category, and each field may allow a user to input information relevant to the risk element with which the field may be associated. Thus, with regard to the listings in the example above, a user may be able to enter into the fields in input column 425 the total number of billable associates in the process, the number of managers involved in the process, and the number of managers involved in the process that are managing more than one team.

Additionally or alternatively, the system automatically may populate one or more fields in input column 425 with information that the system automatically collects from one or more databases. For example, the system may be configured to retrieve and/or analyze records in one or more databases, and the records may include, for instance, personnel information that indicates which resources are involved in what projects. Thus, with regard to the example above, the system automatically may populate one or more of the fields in input column 425 with the total number of billable associates in the process, the number of managers involved in the process, and the number of managers involved in the process that are managing more than one team.

Figure 5:
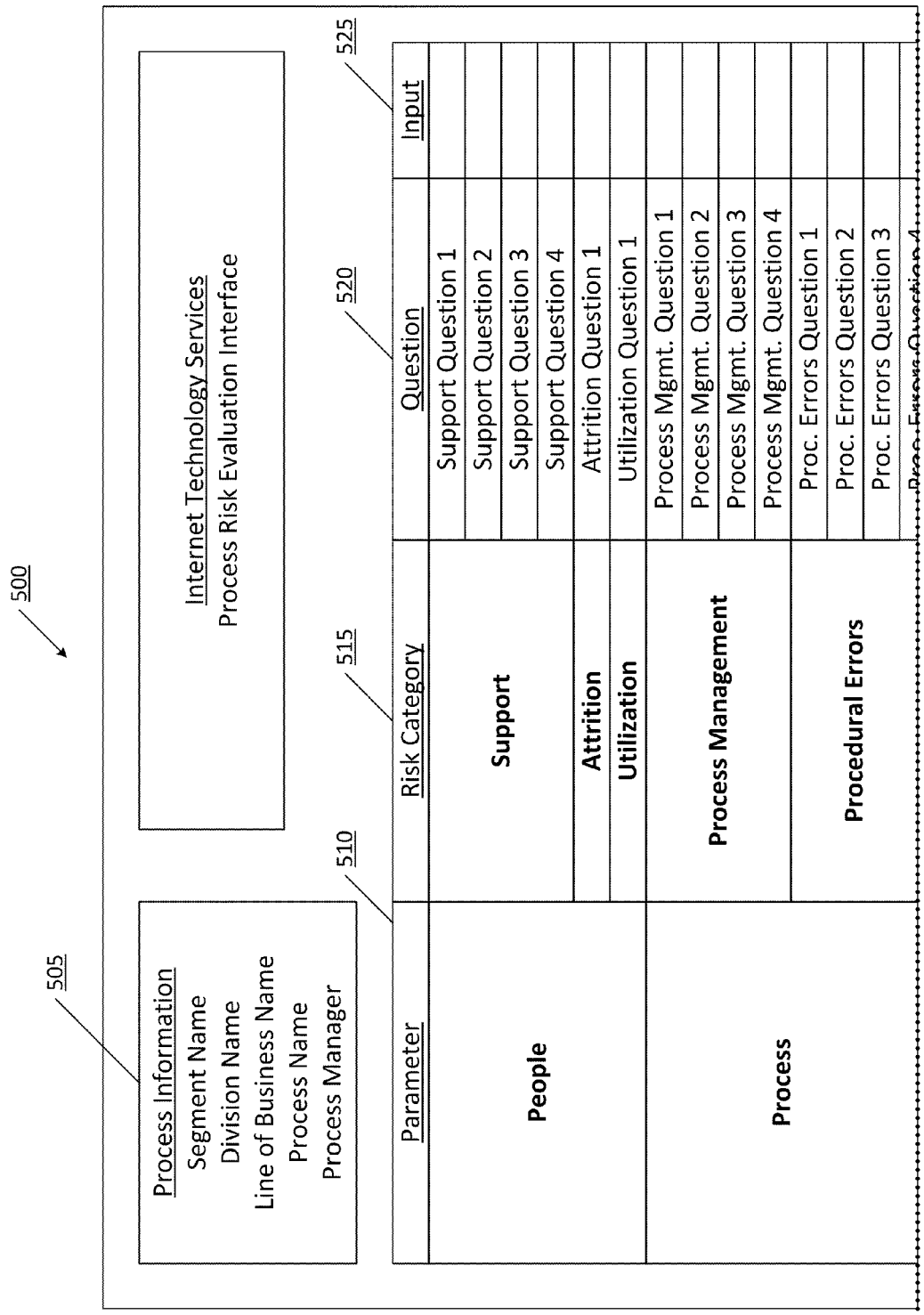
FIG. 5 illustrates a sample user interface by which one or more risk elements associated with a process may be assessed according to one or more aspects described herein.

FIG. 5 illustrates a sample user interface by which one or more risk elements associated with a process may be assessed according to one or more aspects described herein. In one or more configurations, user interface 500 may include and/or facilitate the inputting of information related to one or more processes, such as process management information and/or risk management information. User interface 500 may be similar to user interface 400, and thus user interface 500 may provide similar functionalities as user interface 400. FIG. 5 illustrates, however, how a user interface (e.g., user interface 500) may be modified to relate to a different type of process, as user interface 500 may be associated with an "Internet Technology Services" process, while user interface 400 may be associated with a "Business Process Services" process. Such flexibility may be desirable, as different process may raise different concerns.

Thus, in one or more configurations, user interface 500 may include process information box 505, risk parameter column 510, risk category column 515, risk element column 520, and input column 525, which may be similar to and/or provide similar functionalities as process information box 405, risk parameter column 410, risk category column 415, risk element column 420, and input column 425, respectively. As may be seen in FIG. 5, for instance, risk parameter column 510 may include the same risk parameters as risk parameter column 410, but risk category column 515 and risk element column 520 might include different risk categories and risk elements than risk category column 415 and risk element column 420, respectively. For example, risk category column 515 may include a "Support" risk category, which may be associated with the "People" risk parameter, and risk element column 520 may include a plurality of listings and/or questions related to the "Support" risk category. As FIG. 5 thus illustrates, the system and/or one or more user interfaces described herein may be adapted to be used with different processes and/or different types of processes.

FIG. 6 illustrates a sample user interface that includes a risk scorecard according to one or more aspects described herein.

According to one or more aspects, user interface 600 may be used to display and/or report the results of processing, calculation, and/or determination described herein. Thus, user interface 600 may represent a risk scorecard that displays information about an organization and/or a unit of the organization (or other internal division thereof). In addition, while all of the information included in user interface 600 might not fit on a single display, user interface 600 may allow a user to scroll through the entirety of the user interface, as indicated by the dotted lines in FIG. 6.

In one or more configurations, user interface 600 may include risk overview area 605. Risk overview area 605 may provide a summary of risk information and/or analysis related to the organization and/or the unit of the organization that may be the subject of the risk scorecard represented by user interface 600. Thus, risk overview area 605 may include identification column 610, people breakdown column 615, people risk direction column 620, process breakdown column 625, as well as a breakdown column and a risk direction column (not illustrated) for other risk parameters that may be used in the analysis, such as the "System" risk parameter, the "External Event" risk parameter, and the "Compliance" risk parameter, and an overall breakdown column and an overall risk direction column (not illustrated), which may represent the overall breakdown and the overall risk direction for the organization and/or the line of business or other organizational unit, accounting for all of the risk parameters. The one or more breakdown columns and/or risk direction columns that are not illustrated may be similar to and provide similar functionalities as the one or more breakdown columns and/or risk directions columns that are illustrated, respectively.

In at least one configuration, identification column 610 may include the name of the organization and/or the unit of the organization or other internal division thereof (e.g., line of business) that may be the subject of the risk scorecard represented by user interface 600, which in the example user interface illustrated in FIG. 6, may be "Line of Business 1."

In at least one configuration, people breakdown column 615 may include information about one or more processes managed and/or implemented by a particular business unit (e.g., "Line of Business 1" in this example user interface). For instance, people breakdown column 615 may include indications of the number of processes with a high "People" risk parameter score (which may be calculated in a manner as further described above) (e.g., "0" in the illustrated example user interface), a medium "People" risk parameter score (e.g., "5"), and a low "People" risk parameter score (e.g., "42"). A high risk parameter score may be defined as a risk parameter score that is 100 or more, a medium risk parameter score may be defined as a risk parameter score that is between 50 and 100, and a low risk parameter score may be defined as a risk parameter score that is 50 or less.

In at least one configuration, people risk direction column 620 may include an arrow that may indicate, in relation to data from a previous time period (e.g., last month's data and/or last year's data), the direction in which the "People" risk parameter scores are moving. For instance, people risk direction column 620 may include an upward-pointing arrow to indicate that the "People" risk parameter scores are increasing (e.g., because there may be a greater number of high risk parameter scores and/or medium risk parameter scores than there was in the previous time period), a horizontal-pointing arrow to indicate that the "People" risk parameter scores are steady (e.g., because there may be the same number of high risk parameter scores and/or medium risk parameter scores than there was in the previous time period), or a downward-pointing arrow to indicate that the "People" risk parameter scores are decreasing (e.g., because there may be a fewer number of high risk parameter scores and/or medium risk parameter scores than there was in the previous time period). Thus, it may be observed that in this example user interface, the "People" risk parameter scores may be steady, as people risk direction column 620 includes a horizontal-pointing arrow.

Additionally or alternatively, people risk direction column 620 further may include a designation of the residual risk associated with the "People" risk parameter and/or a designation of whether the residual risk associated with the "People" risk parameter is unsatisfactory, needs improvement, or is satisfactory. For example, the designation of the residual risk may represent an assessment of the particular risk parameter scores for the organization and/or the unit of the organization (or other internal division thereof) that may be the subject of the risk scorecard represented by user interface 600. For instance, if low "People" risk parameter scores predominate over high and medium "People" risk parameter scores, as they do in the example people breakdown column 615 illustrated in FIG. 6, a designation of "L" may be included in people risk direction column 620 as the designation of the residual risk associated with the "People" risk parameter. Likewise, if medium or high risk parameter scores for a particular risk parameter predominate over other risk parameter scores, a designation of "M" or "H," respectively, may be included in an appropriate risk parameter column corresponding to the particular risk parameter. Additionally or alternatively, the designation may be color-coded, and red may represent "H," yellow may represent "M," and green may represent "L."

In addition, the designation of whether the residual risk associated with the "People" risk parameter is unsatisfactory, needs improvement, or is satisfactory may be based on direction in which the risk parameter scores for the particular risk parameter are moving and the designation of the residual risk for the particular risk parameter. For instance, if the risk parameter scores for the "People" risk parameter are increasing and the designation of the residual risk for the "People" risk parameter is "H," a designation of "Unsatisfactory" may be included in people risk direction column 620. On the other hand, if the risk parameter scores for the "People" risk parameter are decreasing and the designation of the residual risk for the "People" risk parameter is "L," a designation of "Satisfactory" may be included in people risk direction column 620. Other combinations may result in the inclusion of a designation of "Needs Improvement" in people risk direction column 620. In addition, the designation may be color-coded, and red may represent "Unsatisfactory," yellow may represent "Needs Improvement," and green may represent "Satisfactory."

In one or more configurations, user interface 600 may include risk detail area 630. Risk detail area 630 may include risk information and/or analysis related to the organization and/or the unit of the organization that may be the subject of the risk scorecard represented by user interface 600 (e.g., "Line of Business 1"). Thus, risk detail area 630 may include risk parameter column 635, risk assessment column 640, and action item column 645.

In at least one configuration, risk parameter column 635 may include one or more risk parameters, such as "People," "Process," "System," "External Event," and "Compliance," as well as an "Overall" listing. Risk assessment column 640 may include one or more risk assessment listings, where each risk assessment listing may correspond to the risk parameter adjacently listed in risk parameter column 635. Each risk assessment may indicate the direction in which the particular risk parameter is moving, which may be determined in a manner described above, as well as one or more risk assessment points. For instance, for the "People" risk parameter, the corresponding risk assessment listing in risk assessment column 640 may indicate that the direction of risk is stable (as further described above with respect to people risk direction column 620) and may include "risk assessment point 1." "Risk assessment point 1" may include, for instance, additional information about the "People" risk assessment parameter. For example, the system may determine automatically that while the direction of risk may be stable when compared to the previous month's data, the direction of risk may have been declining over the previous six months, and thus "risk assessment point 1" may state accordingly that "Direction of risk has been declining over the previous six months."

In at least one configuration, action item column 645 may include one or more action item listings, where each action item listing may correspond to the risk parameter listed in a corresponding row in risk parameter column 635. Each action item may be generated automatically by the system and/or received from user input, and each action item may include one or more tasks to be undertaken to improve the risk parameter scores for the particular risk parameter. For example, action item column 645 may include "Action Item 1" and "Action Item 2," which both may correspond to the "People" risk parameter in risk parameter column 635.

In at least one configuration, the system may generate one or more action items automatically. For example, the system may analyze the risk parameter scores for the "People" risk parameter and may determine that, based on information obtained from one or more databases, an increase in the number of risk managers has been directly proportional to a decrease in residual risk associated with the "People" risk parameter. Thus, the system automatically may generate and/or display an action item for the "People" risk parameter that states that "The decrease in the direction of risk over the past six months has been proportional to the increase in the number of risk managers that have been hired. Thus, more risk managers should be hired to reduce the residual risk in the 'People' risk parameter further."

FIG. 7 illustrates a sample user interface that includes a summary risk scorecard according to one or more aspects described herein. According to one or more aspects, user interface 700 may be used to display and/or report the results of process, calculation, and/or other determination described herein. Thus, user interface 700 may represent a risk scorecard that displays summary information about an organization and/or one or more units of the organization (or other internal divisions thereof). In addition, and as similar to other user interfaces illustrated and/or described herein, while all of the information included in user interface 700 might not fit on a single display, user interface 700 may allow a user to scroll through the entirety of the user interface, as indicated by the dotted lines in FIG. 7.

In one or more configurations, user interface 700 may be similar to user interface 600, except that where user interface 600 may be primarily concerned with one line of business and/or other internal division within an organization, user interface 700 may be primarily concerned with a plurality of lines of business and/or other internal divisions within the organization. For example, user interface 700 may include a summary risk scorecard 705. Summary risk scorecard 705 may include line of business listing 710, people breakdown column 715, people risk direction column 720, process breakdown column 725, as well as a breakdown column and a risk direction column (not illustrated) for other risk parameters that may be used in the analysis, such as the "System" risk parameter, the "External Event" risk parameter, and the "Compliance" risk parameter, and an overall breakdown column and an overall risk direction column (not illustrated), which may represent the overall breakdown and the overall risk direction for the organization and/or the line of business or other organizational unit, accounting for all of the risk parameters. The one or more breakdown columns and/or risk direction columns that are not illustrated may be similar to and provide similar functionalities as the one or more breakdown columns and/or risk directions columns, respectively, which are illustrated.

In at least one configuration, line of business listing 710 may be similar to identification column 610, except that line of business listing 710 may include the names of a plurality of organizations and/or units of the organizations or other internal divisions thereof (e.g., lines of business) that may be the subject of risk scorecard 705. For example, line of business listing 710 may include an "Enterprise Overall Risk" listing, which may represent the organization in its entirety, in addition to a plurality of "Line of Business" listings, organized under one or more subheadings, such as "Line of Business 1" and "Line of Business 2." In at least one arrangement, a subheading may identify an operational group in which the one or more below-listed lines of business may be included.

In at least one configuration, people breakdown column 715 may be similar to people breakdown column 615, except that people breakdown column 715 may include information about one or more processes managed and/or implemented by a plurality of organizations and/or units of the organizations or other internal divisions thereof (e.g., lines of business). Thus, similar to people breakdown column 615, people breakdown column 715 may include indications of the number of processes within each of the lines of business with a high "People" risk parameter score, a medium "People" risk parameter score, and a low "People" risk parameter score.

In at least one configuration, people risk direction column 720 may be similar to people risk direction column 620, except that people risk direction column 720 may include information about one or more processes managed and/or implemented by a plurality of organizations and/or units of the organizations or other internal divisions thereof (e.g., lines of business). Thus, similar to people risk direction column 620, people risk direction column 720 may include a plurality of arrows, and each arrow may indicate the direction in which the "People" risk parameter scores are moving for the corresponding line of business. In addition, and similar to people risk direction column 620, people risk direction column 720 may include a plurality of designations of the residual risk associated with the "People" risk parameter for the corresponding line of business and/or a designation of whether the residual risk associated with the "People" risk parameter is unsatisfactory, needs improvement, or is satisfactory for the particular line of business.

According to one or more aspects, and as further described above, risk associated with a process may be evaluated. For example, a user, such as a risk manager, may be presented with one or more user interfaces. The one or more user interfaces may include a plurality of questions aimed at measuring various aspects of a single business process, and each question may be associated with a particular risk element, a particular risk category, and a particular risk parameter. For instance, a question like "How many associates are involved in the process?" may represent a risk element measuring how many associates may be involved in the process. And in this example, such a risk element may be associated with a "Support" risk category and a "People" risk parameter.

Using the user interfaces, the user may provide input to the system by answering the one or more questions that may be included in the user interfaces. Based on this input, the system may calculate an exposure score for each risk element. Then, the system may determine a likelihood score and an impact score for each risk element, as further described above. The system subsequently may multiply, for each risk element, the exposure score by the likelihood score by the impact score, and the product of this multiplication may represent, for each risk element, a risk element score.

Having determined a plurality of risk element scores, the system then may calculate a risk category score for each risk category, and this calculation may be accomplished by computing the average of (or a weighted average of) the risk element scores for the risk elements associated with the particular risk category. Similarly, the system then may calculate a risk parameter score for each risk parameter, and this calculation may be accomplished by computing the average of (or a weighted average of) the risk category scores for the risk categories associated with the particular risk parameter. Thereafter, the system may calculate an overall risk score for the process by computing the average of (or a weighted average of) the risk parameter scores.

Subsequently, these steps of receiving user input related to a business process and then calculating risk element scores, risk category scores, risk parameter scores, and overall risk scores may be repeated for a plurality of business processes. For instance, an organization may wish to evaluate all of its business processes in this manner, and accordingly may do so.

Once a plurality of risk element scores, risk category scores, risk parameter scores, and overall risk scores have been determined for the plurality of business processes, the system may generate a risk scorecard. The risk scorecard may include information about the plurality of business processes, and it may break down such information into the various risk parameters and risk categories. By organizing the information in this way, the risk scorecard may assist the organization and/or a risk manager in determining which aspects of the organization's activities are associated with what levels of risk.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A method, comprising:
   receiving, using at least one computer, input corresponding to at least one risk element applicable to at least one process, each of the at least one risk element being associated with at least one risk category, and each of the at least one risk category being associated with at least one risk parameter;
   determining, using the at least one computer, based on the received input, an exposure score for each of the at least one risk element;
   determining, using the at least one computer, based on stored impact information, an impact score for each of the at least one risk element;
   determining, using the at least one computer, based on stored trend information, a likelihood score for each of the at least one risk element;
   determining, using the at least one computer, based on the corresponding exposure score for each of the at least one risk element, the corresponding impact score for each of the at least one risk element, and the corresponding likelihood score for each of the at least one risk element, an element score for each of the at least one risk element;
   determining, using the at least one computer, for each of the at least one risk category, a risk category score, based on the at least one element score for the at least one risk element associated with the risk category;
   determining, using the at least one computer, for each of the at least one risk parameter, a risk parameter score, based on the at least one risk category score for the at least one risk category associated with the risk parameter;
   determining, using the at least one computer, based on the at least one risk parameter score, an overall risk score for the at least one process; and
   generating, using the at least one computer, a risk scorecard, the risk scorecard including the overall risk score for the at least one process.

2. The method of claim 1, wherein the risk scorecard further includes the at least one risk parameter score.

3. The method of claim 1,
   wherein the at least one risk parameter includes a people risk parameter, a process risk parameter, a systems risk parameter, an external events risk parameter, and a compliance risk parameter;
   wherein a span of control risk category, an attrition risk category, and a utilization issues risk category correspond to the people risk parameter;
   wherein a procedural errors risk category, a financial loss risk category, a process management risk category, and a business continuity planning issues risk category correspond to the process risk parameter;
   wherein a performance issues risk category and an outage losses risk category correspond to the systems risk parameter;
   wherein a reputation risk category and an external risk category correspond to the external events risk parameter; and
   wherein an audit issue risk category, a privacy risk category, an associate investment policy risk category, and a legal and regulatory compliance risk category correspond to the compliance risk parameter.

4. The method of claim 1, wherein the stored trend information includes, for each of the at least one risk element, a projection based on previously received input corresponding to the at least one risk element.

5. The method of claim 1, wherein determining an exposure score for each of the at least one risk element includes calculating an amount of deviation for the at least one risk element in view of a predefined standard.

6. The method of claim 1, wherein a first set of risk elements is applicable to a first process, and wherein a second set of risk elements is applicable to a second process, the first process being different from the second process, and the first set being different from the second set.

7. One or more non-transitory computer-readable media having computer-executable instructions stored thereon, that when executed by one or more computers, cause the one or more computers to perform:

receiving input corresponding to at least one risk element applicable to at least one process, each of the at least one risk element being associated with at least one risk category, and each of the at least one risk category being associated with at least one risk parameter;

determining, based on the received input, an exposure score for each of the at least one risk element;

determining, based on stored impact information, an impact score for each of the at least one risk element;

determining, based on stored trend information, a likelihood score for each of the at least one risk element;

determining, based on the corresponding exposure score for each of the at least one risk element, the corresponding impact score for each of the at least one risk element, and the corresponding likelihood score for each of the at least one risk element, an element score for each of the at least one risk element;

determining, for each of the at least one risk category, a risk category score, based on the at least one element score for the at least one risk element associated with the risk category;

determining, for each of the at least one risk parameter, a risk parameter score, based on the at least one risk category score for the at least one risk category associated with the risk parameter;

determining, based on the at least one risk parameter score, an overall risk score for the at least one process;

generating a risk scorecard, the risk scorecard including the overall risk score for the at least one process.

8. The non-transitory computer-readable media of claim 7, wherein the risk scorecard further includes the at least one risk parameter score.

9. The non-transitory computer-readable media of claim 7,
wherein the at least one risk parameter includes a people risk parameter, a process risk parameter, a systems risk parameter, an external events risk parameter, and a compliance risk parameter;
wherein a span of control risk category, an attrition risk category, and a utilization issues risk category correspond to the people risk parameter;
wherein a procedural errors risk category, a financial loss risk category, a process management risk category, and a business continuity planning issues risk category correspond to the process risk parameter;
wherein a performance issues risk category and an outage losses risk category correspond to the systems risk parameter;
wherein a reputation risk category and an external risk category correspond to the external events risk parameter; and
wherein an audit issue risk category, a privacy risk category, an associate investment policy risk category, and a legal and regulatory compliance risk category correspond to the compliance risk parameter.

10. The non-transitory computer-readable media of claim 7, wherein the stored trend information includes, for each of the at least one risk element, a projection based on previously received input corresponding to the at least one risk element.

11. The non-transitory computer-readable media of claim 7, wherein determining an exposure score for each of the at least one risk element includes calculating an amount of deviation for the at least one risk element in view of a predefined standard.

12. The non-transitory computer-readable media of claim 7, wherein a first set of risk elements is applicable to a first process, and wherein a second set of risk elements is applicable to a second process, the first process being different from the second process, and the first set being different from the second set.

13. An apparatus, comprising:
a processor; and
memory storing computer-readable instructions that, when executed by the processor, cause the apparatus to perform:

receiving input corresponding to at least one risk element applicable to at least one process, each of the at least one risk element being associated with at least one risk category, and each of the at least one risk category being associated with at least one risk parameter;

determining, based on the received input, an exposure score for each of the at least one risk element;

determining, based on stored impact information, an impact score for each of the at least one risk element;

determining, based on stored trend information, a likelihood score for each of the at least one risk element;

determining, based on the corresponding exposure score for each of the at least one risk element, the corresponding impact score for each of the at least one risk element, and the corresponding likelihood score for each of the at least one risk element, an element score for each of the at least one risk element;

determining, for each of the at least one risk category, a risk category score, based on the at least one element score for the at least one risk element associated with the risk category;

determining, for each of the at least one risk parameter, a risk parameter score, based on the at least one risk category score for the at least one risk category associated with the risk parameter;

determining, based on the at least one risk parameter score, an overall risk score for the at least one process; and generating a risk scorecard, the risk scorecard including the overall risk score for the at least one process.

14. The apparatus of claim 13, wherein the risk scorecard further includes the at least one risk parameter score.

15. The apparatus of claim 13,
wherein the at least one risk parameter includes a people risk parameter, a process risk parameter, a systems risk parameter, an external events risk parameter, and a compliance risk parameter;
wherein a span of control risk category, an attrition risk category, and a utilization issues risk category correspond to the people risk parameter;
wherein a procedural errors risk category, a financial loss risk category, a process management risk category, and a business continuity planning issues risk category correspond to the process risk parameter;
wherein a performance issues risk category and an outage losses risk category correspond to the systems risk parameter;
wherein a reputation risk category and an external risk category correspond to the external events risk parameter; and
wherein an audit issue risk category, a privacy risk category, an associate investment policy risk category, and a legal and regulatory compliance risk category correspond to the compliance risk parameter.

16. The apparatus of claim 13, wherein the stored trend information includes, for each of the at least one risk element, a projection based on previously received input corresponding to the at least one risk element.

17. The apparatus of claim 13, wherein determining an exposure score for each of the at least one risk element includes calculating an amount of deviation for the at least one risk element in view of a predefined standard.

18. The apparatus of claim 13, wherein a first set of risk elements is applicable to a first process, and wherein a second set of risk elements is applicable to a second process, the first process being different from the second process, and the first set being different from the second set.

19. The method of claim 1, wherein the risk scorecard includes one or more arrows to indicate whether one of the overall risk score and the at least one risk parameter score is increasing or decreasing.

20. The method of claim 19, wherein the one or more arrows are color-coded so that the one or more arrows have a color based on a level of risk.

21. The method of claim 1, further comprising:

determining one or more additional risk parameter scores for the at least one risk parameter of one or more additional processes, each of the one or more additional processes belonging to a common line of business, wherein the risk scorecard includes a risk overview area for providing a summary of risk information for the common line of business, the risk overview area including information indicating how many of the one or more additional risk parameter scores are at a low risk level, medium risk level, and high risk level.

* * * * *